J. TESSIER.
TRIPOD HEAD.
APPLICATION FILED APR. 30, 1913.
1,082,053.
Patented Dec. 23, 1913.
2 SHEETS—SHEET 1.
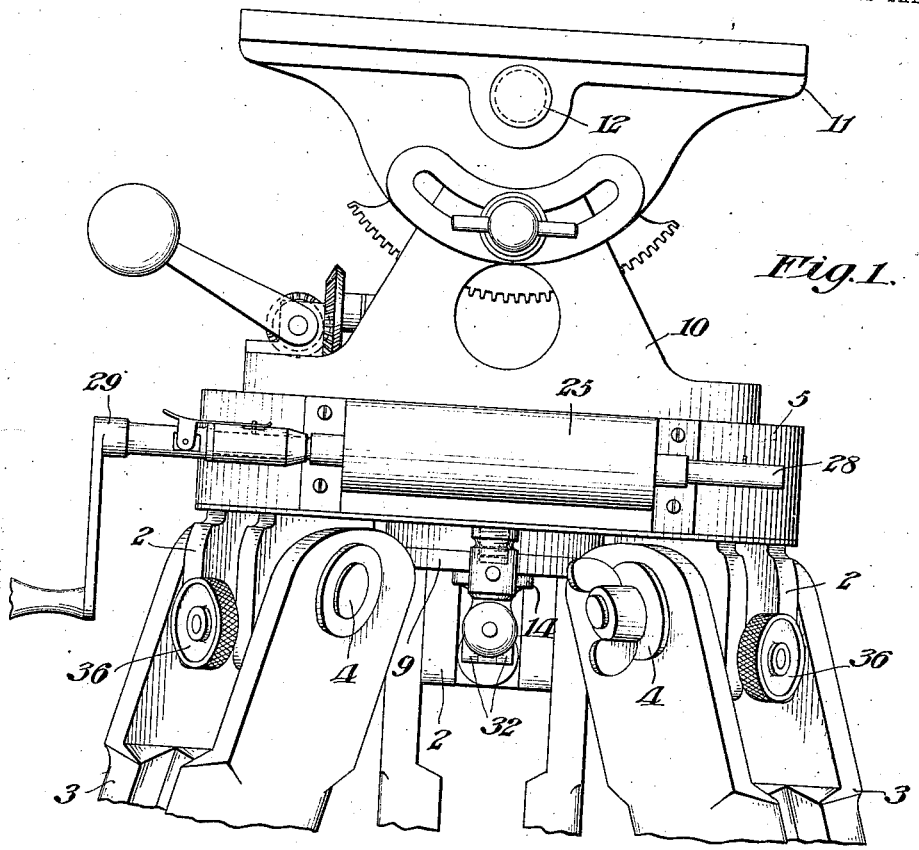
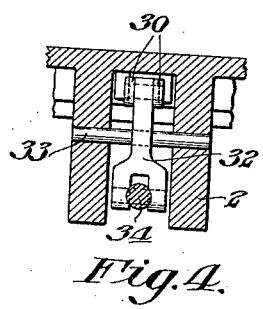
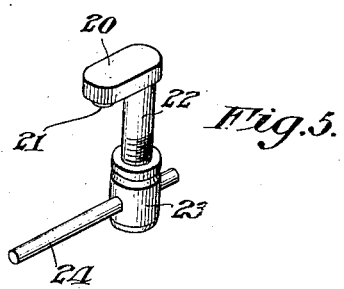
WITNESSES:
INVENTOR
Julien Tessier,
BY
Charles N. Butler
ATTORNEY.

J. TESSIER.
TRIPOD HEAD.
APPLICATION FILED APR. 30, 1913.

1,082,053.

Patented Dec. 23, 1913.
2 SHEETS—SHEET 2.

WITNESSES:

INVENTOR
Julien Tessier,
BY
Charles N. Butler
ATTORNEY.

UNITED STATES PATENT OFFICE.

JULIEN TESSIER, OF PHILADELPHIA, PENNSYLVANIA, ASSIGNOR TO LUBIN MANUFACTURING COMPANY, OF PHILADELPHIA, PENNSYLVANIA, A CORPORATION OF PENNSYLVANIA.

TRIPOD-HEAD.

1,082,053.

Specification of Letters Patent.   Patented Dec. 23, 1913.

Application filed April 30, 1913.   Serial No. 764,505.

*To all whom it may concern:*

Be it known that I, JULIEN TESSIER, a citizen of the Republic of France, residing in the city of Philadelphia, county of Philadelphia, and State of Pennsylvania, have invented certain Improvements in Tripod-Heads, of which the following is a specification.

My invention relates to tripod heads suitable for use with cameras, particularly of the motion picture and panoramic types, and its leading object is to provide a head having improved means for turning the camera, for clamping it in position, and for connecting and disconnecting the actuating mechanism.

The characteristic features of my improvements are fully disclosed in the following description and the accompanying drawings in illustration thereof.

Figure 2:
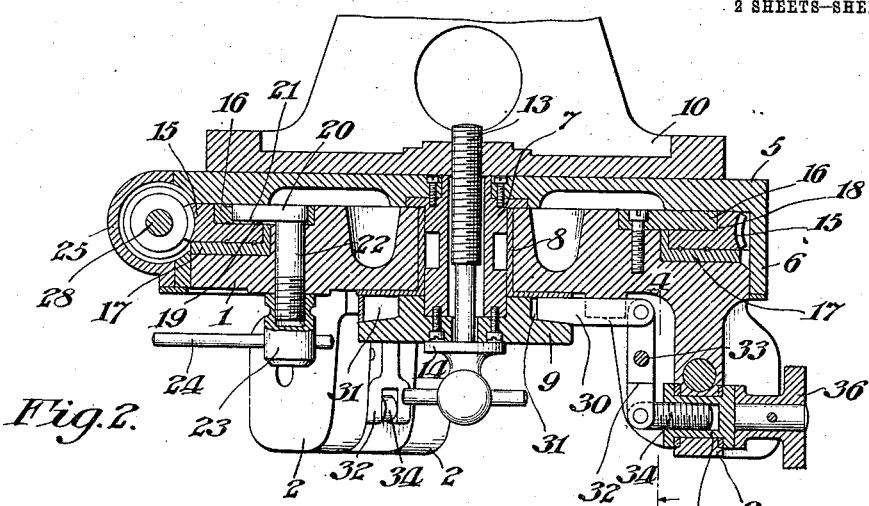
Figure 3:
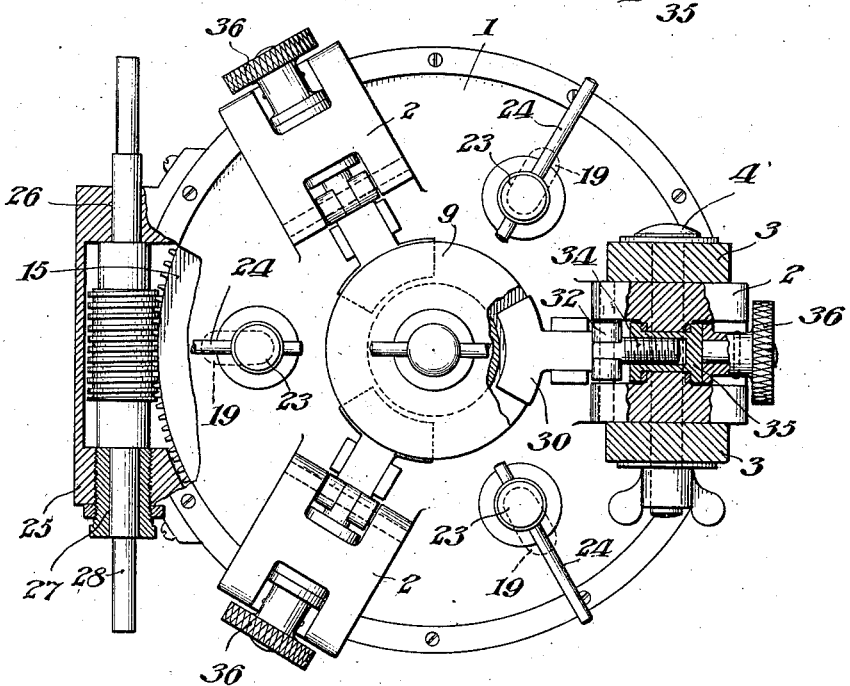

In the drawings, Figure 1 is an elevation of a tripod head embodying my improvements; Fig. 2 is a vertical sectional view taken through the center of the same; Fig. 3 is a part sectional bottom plan view of the construction shown in Fig. 2; Fig. 4 is a sectional view taken on the line 4—4 of Fig. 2; and Fig. 5 is a perspective view of a clamping device comprised in my invention.

The mechanism, as illustrated in the drawings, comprises the base 1 having the depending bearings 2 to which are connected the legs 3 by the pintles 4. A plate or cap 5 is revolubly mounted on the base, the cap having the cylindrical skirt 6 encircling the periphery of the base and the vertical arbor 7 revoluble in the vertical axial bearing 8 of the base, the arbor having the hub 9 fixed to the bottom thereof in engagement with the base. A bearing 10, having the seat 11 mounted on the journals 12 thereof, is fixed to the cap 5 by a screw 13 which passes through the arbor 7 into the bearing 10 and is provided with the flange 14 which frictionally engages the disk 9, the parts 5, 7, 9, 10 and 13 being revoluble as a unit with reference to the part 1.

A worm gear ring 15 is held, by a ring 16 fixed to the head, in the bearing 17 of said head, the ring 16 lying in the channel 18, of angular cross section, of the gear ring and having therein radial slots 19 in which are disposed arms 20 provided with bosses 21 adapted for engaging the ring 15. The arms 20 are fixed on bolts 22 extending downwardly through the head and being engaged by the nuts 23 turned on the bolts by pins 24. A housing 25 is fixed to the skirt 6 and has journaled in the bearings 26 and 27 thereof the worm shaft 28. The worm shaft engages the teeth of the ring 15 and is revoluble by a handle 29 adapted to be sleeved on an end thereof.

Clamps 30, which lie in a channel 31 of the hub 9, are pivotally connected to levers 32 fulcrumed on the bearings 33, the levers being pivotally connected to threaded studs 34 engaged by the threaded spools 35 journaled in the bearings 2 and turned by the knurled heads 36 fixed thereto.

When it is desired to turn the parts 10 and 11 on their vertical axis, the pins 24 are turned and the nuts 25 are caused to draw down the bolts 22 and the arms 20 thereon, causing the studs 21 to clamp the ring 15 to the base 1, it being understood that the clamps 30 have been drawn back in the channel 31 by turning the heads 36 fixed on the spools 35 and by the consequent revolution of such spools moving the studs 34 toward the vertical axis of the apparatus. The handle 29 is now revolved to revolve the worm shaft 28 in engagement with the now stationary ring 15, and the cap 5, with the parts thereon, is revolved by the thrust of the shaft upon the bearings 26 or 27, depending upon the direction of revolution. When the revolving parts have been brought to the desired position, the heads 36 are turned and the spools 35 revolved to draw the studs 34 thereinto, whereby the clamps 30 are moved into the channel 31 so as to positively engage the part 9, whereby the members that have been revolving are fixed. The pins 24 and nuts 23 are now turned to release the tension on the bolts 22 and free the ring 15 by the relaxation of the action of the studs 21 thereon through the arms 20. The handle 29 can now be operated with no effect but the revolution of the released ring 15 and without disturbing the position of the instrument.

Having described my invention, I claim:

1. The combination with a base, of a cap revoluble thereon, a gear ring revoluble on said base, means for fixing said ring to said base, and a journaled worm connected with said cap and engaging said ring.

2. The combination with a base, of a cap having a skirt revoluble thereon, an arbor fixed to said cap and journaled in said base, a clutching device fixed to said arbor, and clutching mechanism adapted for engaging said clutching device whereby said cap and arbor are fixed to said base.

3. The combination with a base, of a worm gear ring revolubly mounted thereon, a member revolubly mounted on said base, means for fixing said ring to said base, and a journaled worm having bearings fixed to said revoluble member and engaging said ring.

4. The combination with a base of a member revoluble thereon, means for fixing said member relatively to said base, a second member revoluble relatively to said base, means for fixing said second member relatively to said base, and means engaging said second named member for revolving said first named member.

5. The combination with a base, of a bearing for an instrument revoluble thereon, lever mechanism for clamping said bearing against revolution, a toothed ring revoluble on said base, means comprising a screw for fixing said ring to said base, and a worm engaging said ring.

6. The combination of a fixed and a revoluble member, one of said members having an arbor journaled in a bearing of the other, a toothed ring carried by one of said members, a worm shaft journaled in the other of said members and engaging said ring, and means for locking said revoluble member against revolution.

7. The combination with a fixed member, of a member revoluble thereon, a ring revoluble on one of said members, means for fixing said ring against revolution, a worm shaft journaled in the other of said members and engaging said ring, and means for fixing said revoluble member against revolution.

8. The combination of a fixed member, a member revoluble thereon, one of said members having an arbor journaled in a bearing of the other, means for revolving said revoluble member, and clamping mechanism for fixing said revoluble member against revolution, said mechanism comprising a fulcrumed lever, a threaded stud pivotally connected thereto, and a threaded spool in which said stud is engaged.

In testimony whereof I have hereunto set my name this 14th day of April, 1913, in the presence of the subscribing witnesses.

JULIEN TESSIER.

Witnesses:
CHARLES GOLDSMITH,
JOS. G. DENNY, Jr.